Nov. 7, 1939.  F. STEBLER  2,179,474

FRUIT TREATING MACHINE

Filed June 1, 1936  2 Sheets-Sheet 1

INVENTOR.
Fred Stebler.
BY Philip A. Minnis
ATTORNEY.

Patented Nov. 7, 1939

2,179,474

UNITED STATES PATENT OFFICE 2,179,474

FRUIT TREATING MACHINE

Fred Stebler, Riverside, Calif., assignor to Food Machinery Corporation, San Jose, Calif., a corporation of Delaware Application June 1, 1936, Serial No. 82,679

2 Claims. (Cl. 146—202)

This invention relates to fruit treating machines of the type employed for cleaning, polishing, washing, drying or otherwise treating fruit, and more especially to such machines as employ a series of transversely arranged treating rolls over which fruit is progressed during treatment thereof.

It is the principal object of my invention to provide an improved machine of this character which is operative to subject the fruit to gentle, uniform and effective treatment and in which mechanical means are employed for progressing and rotating the fruit with respect to the treating rolls.

Another object of my invention is to provide progressing elements associated with the treating rolls which also operate to rotate the fruit to present all surfaces thereof to the treating rolls.

Further, and more specific objects of my invention will be apparent from the following description of an illustrative embodiment thereof, reference therein being had to the accompanying drawings, wherein Fig. 1 is a side elevation of a fruit brushing machine embodying the invention.

Figure 1:
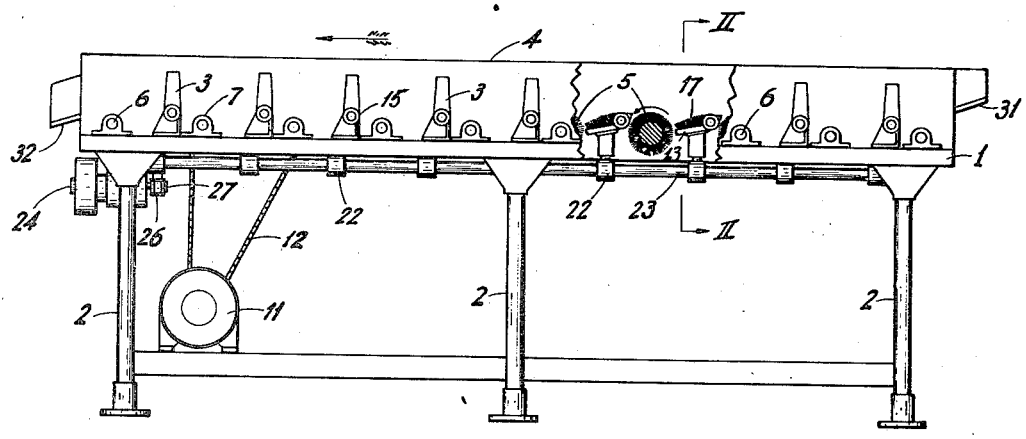

Generally, the present invention contemplates the provision of fruit progressing elements between adjacent treating rolls, which elements also operate to rotate the fruit transversely of the treating rolls during treatment thereof, so that the entire surface of the fruit is presented to the treating rolls.

The fruit treating machine illustrated comprises a pair of longitudinally extending frame members 1 supported upon legs 2, and carrying as by brackets 3, a pair of side members 4. Mounted for rotation in parallel spaced relation between side members 4 are a series of transverse treating rolls 5 secured to and carried by shafts 6 passing through rails 4 and journaled in fixed bearings 7 secured to frame members 1.

Figure 2:
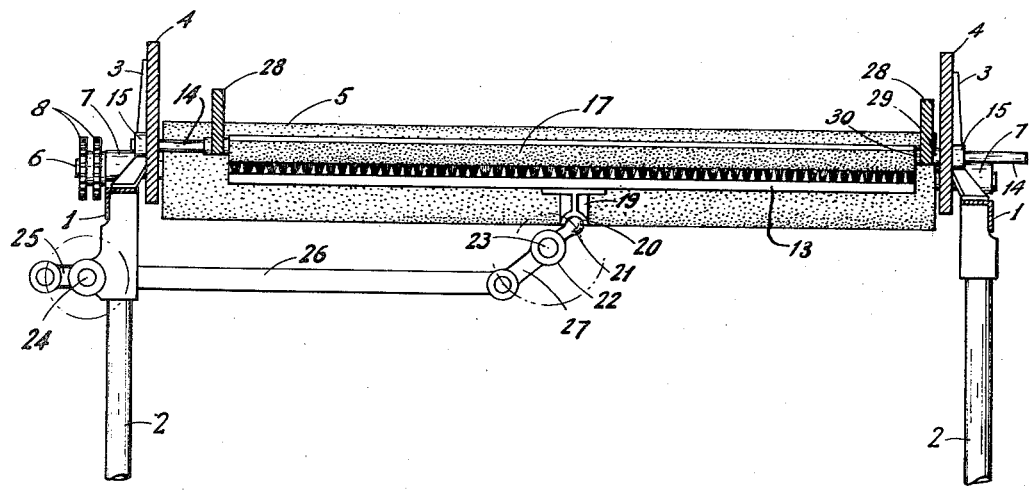
Fig. 2 is an enlarged fragmentary sectional view taken on the line II—II of Fig. 1.
Figure 3:
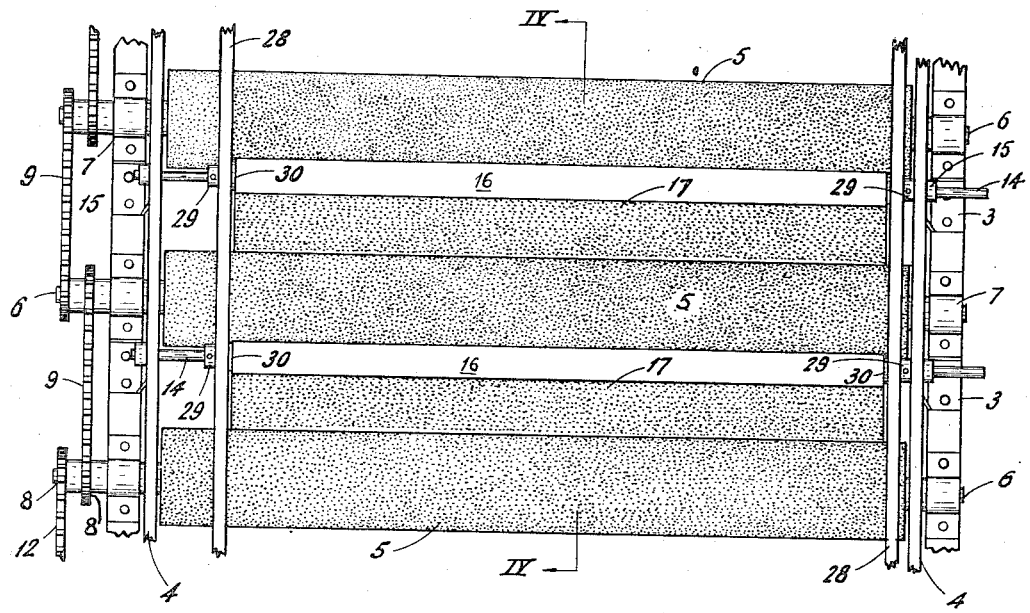
Fig. 3 is an enlarged fragmentary plan view.

Rolls 5 are shown as cylindrical brushes of the type employed for polishing and cleaning fruit, but other forms of rolls may be employed, such as absorbent or metallic rolls used in other treating processes. Rolls 5 are driven at a uniform speed and in the same direction, and for this purpose are interconnected by means of pairs of sprockets 8 (Fig. 2), secured on the end of each shaft 6, and connected by chains 9 (Fig. 3). One set of sprockets 8 on adjacent shafts 6 (Figs. 1 and 3) are connected by chain 12 which also engages a suitable drive sprocket driven from electric motor 11.

Means are provided to sequentially progress rows of fruit for successive treatment by rolls 5 and for simultaneously effecting rotation of the fruit with respect to rolls 5 to present the entire surface thereof for treatment. For this purpose, a transverse progressor element is mounted between each adjacent pair of rolls 5 for both vertical and lateral reciprocation. Each progressor element may comprise a base 13, having brush 17 suitably secured thereon. Base 13 has bracket portion 16 (Figs. 3 and 4) secured on shaft 14 and forming a fruit receiving edge substantially aligned with brush 17. Each shaft 14 extends through side members 4 and is supported for pivotal and sliding movements in bosses 15 of brackets 3.

Figure 4:
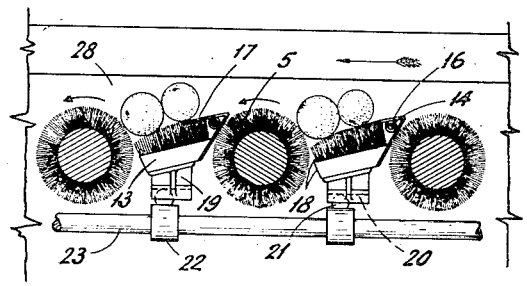
Fig. 4 is a sectional view taken on the line IV—IV of Fig. 3.

As seen in Figs. 3 and 4, each progressor element, including brush member 17, substantially fills the space between adjacent rolls 5, except that the progressor element is shorter to provide for the endwise movement thereof parallel to the axis of rotation of an adjacent roll 5. As seen in Fig. 4, shaft 14 is positioned adjacent the periphery of roll 5 to the rear of the progressor element, so that receiving edge 16 is closely adjacent thereto, and as the surface of rush 17 inclines downwardly from edge 16, a valley is formed above forward edge 18 of the progressor element and the treating roll 5 ahead of the progressor element in the line of travel of the fruit. The ends of the valleys are closed by guard rails 28 (Figs. 2 and 3) extending longitudinally of the machine and having brackets 29 fixed on shafts 14 and spaced from bracket portions 16 of the progressor element by spacers 30. Thus a row of fruit will be positioned between each treating roll 5 and the cooperating brush 17 until such time as the associated progressor element is reciprocated vertically by pivotal movement about the axis of shaft 14 to raise edge 18 to the position shown in Fig. 5 and move the row of fruit from one roll 5 into cooperation with the next roll 5.

Figure 5:
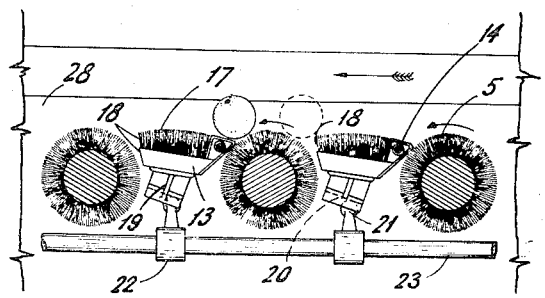
Fig. 5 is a view similar to Fig. 4 with certain parts in a different position.

In the embodiment shown, the vertical and transverse reciprocations of the progressor element are effected by the same means. Each base 13 (Figs. 2 and 4) carries depending bracket 19, having elongated socket 20 which receives ball end 21 of lever 22. Levers 22 for all the progressor elements are secured on shaft 23 which extends longitudinally of the machine and is supported by suitable bearings on frame 1. Shaft 23 (Figs. 1 and 2) carries adjacent one end thereof crank 27 which is connected by pitman 26 to crank 25 on shaft 24. Shaft 24 is driven in any convenient manner to effect periodic oscillation of shaft 23 through pitman 26. Oscillation of shaft 23 and arm 22 as seen in Fig. 2, causes both longitudinal and vertical reciprocation of brush 17. It is to be noted that brush 17 moves constantly transversely of the machine, so that fruit engaged therewith and with the associated treating roll 5, is rotated about axes other than the horizontal transverse axis of rotation thereof about which the fruit is rotated by the action of roll 5. Also brushes 17 are constantly moving in their vertical reciprocation, and at the time brushes 17 reach their uppermost position as shown in Fig. 5, the fruit is positioned as illustrated in dotted lines in Fig. 5 so that the associated treating roll 5 becomes effective to progress the fruit thereover onto receiving edge 16, as shown in full lines, from which position the fruit rolls into the next adjacent valley formed by a brush 17 and roll 5.

It will be seen also that each progressor 13 receives simultaneous similar actuation from shaft 23 so that the various rows of fruit in the machine are progressed simultaneously from treating roll to treating roll after they are fed over runway 31 (Fig. 1) until they are discharged over runway 32.

It is to be noted that the relative endwise or horizontal reciprocation between the treating rolls and the progressor elements serves to rotate the fruit about a plurality of their axes so that the entire surface of each fruit is presented to the treating rolls.

While the invention has been described in connection with a preferred embodiment thereof, it is to be understood that the invention can also be embodied in other forms, and, therefore, I desire the scope of my invention to be limited only by the scope of the appended claims:

1. In a fruit treating machine, a frame, a plurality of cylindrical treating rolls journalled for rotation on fixed axes disposed transversely of said frame, drive means for said rolls, and a progressor element reciprocatably and pivotally mounted between said rolls and having one edge thereof pivoted upon an axis adjacent one roll and having the other edge thereof disposed for substantially vertical movement with respect to the succeeding roll, and means for moving said element axially of said latter roll and for effecting vertical movement of the said other edge of the progressor element.

2. In a fruit treating machine, a frame, a series of treating rolls arranged in parallel relation transversely of said frame, means for driving said rolls to rotate in the same direction, a fruit progressor between each adjacent pair of rolls for progressing fruit from roll to roll transversely thereof, means mounting each said progressor for vertical oscillatory movement relative to an associated roll about an axis parallel to the roll, said mounting means being slidably engaged with said frame to provide for relative endwise movement between said progressors and said rolls, and a pair of guard rails extending longitudinally of the machine and supported by said progressor mounting means at said axes to partake of the movement of said progressors laterally of the machine while confining the fruit being treated between the rails.

FRED STEBLER.